United States Patent [19]

Branson

[11] Patent Number: 4,796,300
[45] Date of Patent: Jan. 3, 1989

[54] RECLOSABLE FLEXIBLE CONTAINER HAVING INTERIOR AND EXTERIOR CLOSURE ELEMENTS INTERLOCKED ON THE CONTAINER WALLS

[75] Inventor: Mark Branson, Shelbyville, Ind.

[73] Assignee: KCL Corporation, Shelbyville, Ind.

[21] Appl. No.: 944,414

[22] Filed: Dec. 19, 1986

Related U.S. Application Data

[63] Continuation-in-part of Ser. No. 796,632, Nov. 8, 1985, abandoned, and a continuation-in-part of Ser. No. 940,003, Dec. 10, 1986.

[51] Int. Cl.$^4$ .............................................. B65D 33/16
[52] U.S. Cl. ........................................ 383/63; 24/462; 24/587; 383/68; 383/81; 383/95
[58] Field of Search ....................... 383/63, 65, 81, 78, 383/68, 69, 61, 93, 95, 97; 24/576, 587, 686, 573, 462

[56] References Cited

U.S. PATENT DOCUMENTS

| | | | |
|---|---|---|---|
| Re. 27,174 | 9/1971 | Ausnit | 383/65 X |
| Re. 28,969 | 9/1976 | Naito | 383/65 |
| 479,655 | 7/1892 | Morton | 383/95 X |
| 800,183 | 9/1905 | Stevens | 383/95 |
| 945,705 | 1/1910 | Crosgrove | 383/95 X |
| 3,425,469 | 2/1969 | Ausnit | 383/65 |
| 4,152,033 | 5/1979 | Ohlmeyer et al. | 24/462 X |
| 4,472,862 | 9/1984 | Bloomfield et al. | 24/462 X |
| 4,662,038 | 5/1987 | Walker | 24/462 X |

FOREIGN PATENT DOCUMENTS

| | | | |
|---|---|---|---|
| 475121 | 7/1951 | Canada | 24/587 |
| 561936 | 10/1932 | Fed. Rep. of Germany | 383/81 |
| 733472 | 2/1944 | Fed. Rep. of Germany | 24/587 |
| 799146 | 8/1958 | United Kingdom | 24/587 |

Primary Examiner—Stephen Marcus
Assistant Examiner—Bryon Gehmon
Attorney, Agent, or Firm—Robert S. Beiser

[57] ABSTRACT

A reclosable flexible container is provided as a pouch having a front wall with an inside and an outside surface, a rear wall with an inside and an outside surface and a pouch opening. A pair of exterior closure elements are provided for mechanical interlocking with a pair of interior closure elements. A wall of the pouch is interposed between each interior and exterior closure element. The interior closure elements further have a mechanical mechanism for selective interlocking with each other so as to seal the pouch or reopen it as desired. As a result a reclosable pouch is provided without the use of heat seals or adhesives.

21 Claims, 2 Drawing Sheets

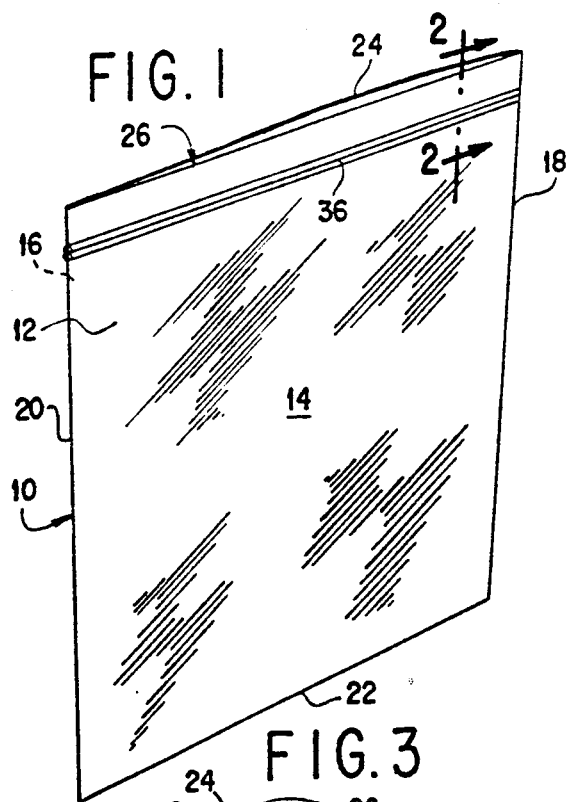
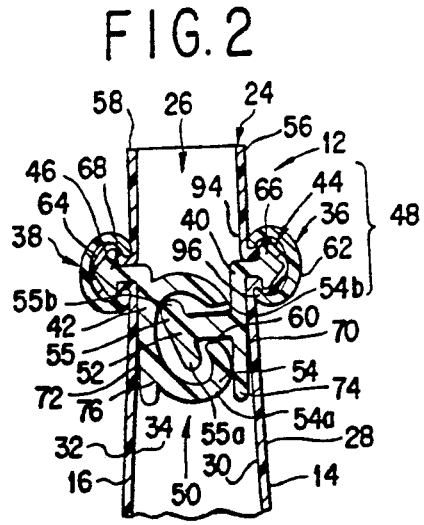
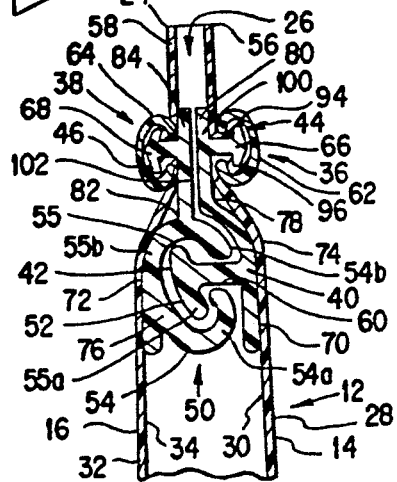
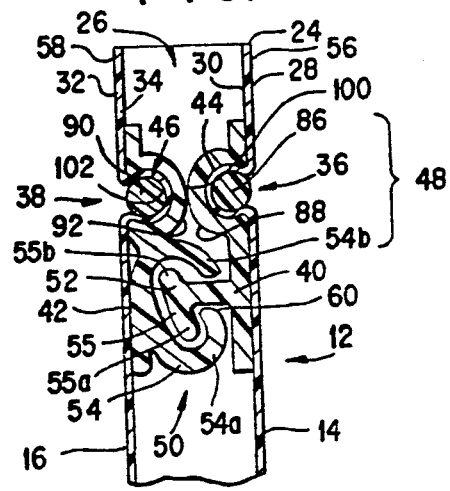
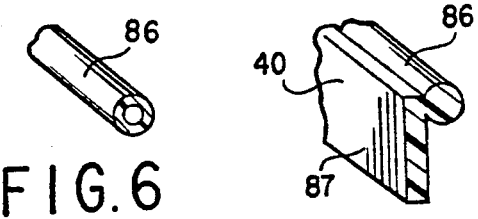

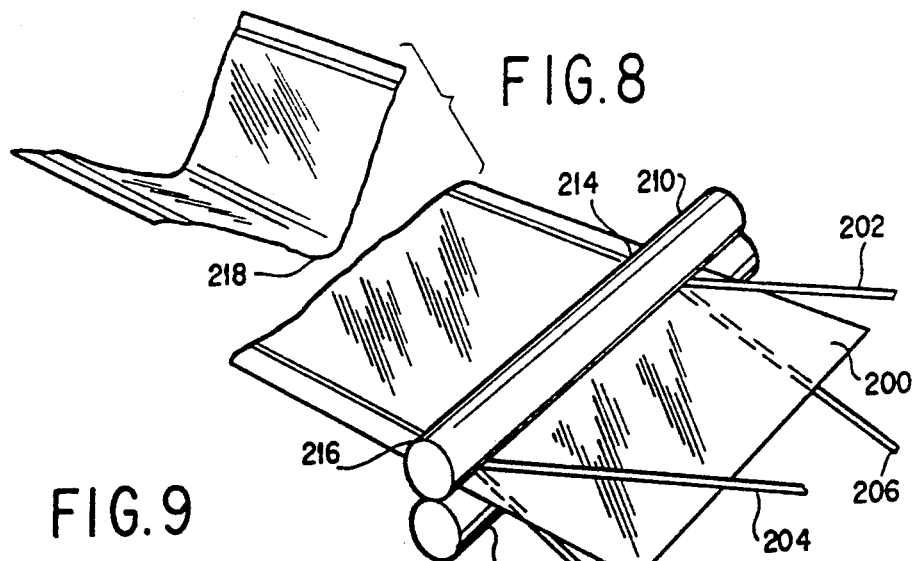
FIG. 8
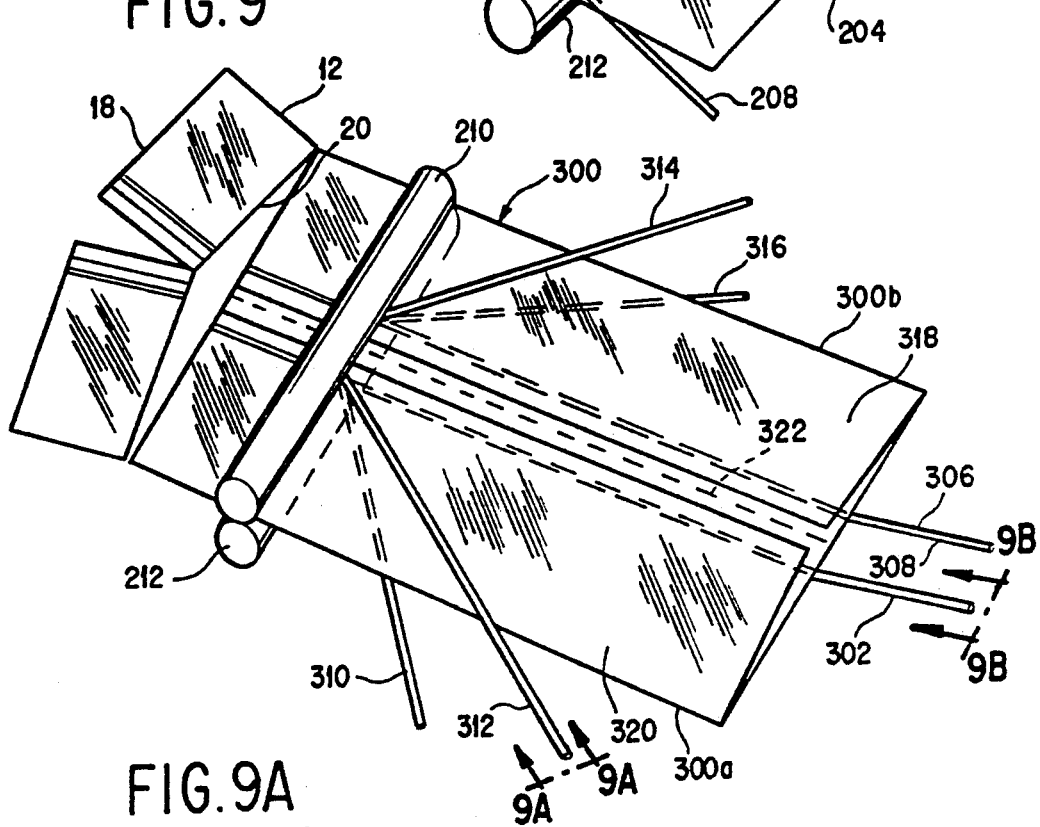
FIG. 9
FIG. 9A
FIG. 9B
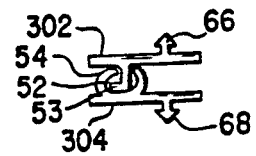

RECLOSABLE FLEXIBLE CONTAINER HAVING INTERIOR AND EXTERIOR CLOSURE ELEMENTS INTERLOCKED ON THE CONTAINER WALLS

BACKGROUND OF THE INVENTION

This application is a continuation in part of U.S. Pat. Application Serial No. 796,632, Reclosable Flexible Container, filed Nov. 8, 1985, now abandoned and U.S. Pat. Application Serial No. 940003, Reclosable Flexible Container, filed Dec. 10, 1986.

The present invention relates generally to reclosable flexible containers and in particular to reclosable flexible containers having fastener profiles mechanically interlocked through the walls of the container for sealing of the container without the use of adhesives or heat sealing.

In the manufacture of reclosable plastic bags, the bags are usually manufactured with a folded bottom edge and side edges sealed to each other about their periphery. Flexible reclosable fastener strips or profiles are usually sealed inside the bag near the bag opening. The bag bodies are formed of plastic film which is extruded separately from the fastener profiles. The fastener strips are extruded with interlocking rib and groove elements carefully shaped and sized so that they will interlock when pressed together and will separate when pulled apart. These fastener strips may have webbed portions which are sealed to the inside of the bag.

Alternatively, continuous fastener profiles may be integrally formed in the plastic film, as shown in U.S. Reissue Pat. No. 28,959, Naito. However, problems have appeared in the past in the sealing of fastener strips to the inside of the bag walls. Among such problems are the dwell period required for sealing of fastener profile strips to flexible film. An additional problem is the requirement for a sufficient thickness of film to heat seal to fastener profiles. Similarly, the film and profile must be of substantially the same material for effective heat sealing. It has also been found that forming the fastener strips integrally with the bag walls tends to reduce the speed of manufacture.

One solution to these problems is the mechanical clamping of the fasteners to the film. It has been known in the past to join sheets of plastic film utilizing clamps or fasteners which grip multiple layers of plastic film from the outside. An example is U.S. Pat. No. 3,893,212, Curry. However, despite a wide variety of configurations of reclosable fastener profile containers in the prior art, use of fasteners clamped to the bag walls have not been shown.

Accordingly, it is an object of the present invention to provide a improved flexible reclosable container without the need for a heat seal of the continuous fastener profile to the surface of the container.

It is a further object of the present invention to provide flexible reclosable containers which may utilize fastener profiles constructed of different materials than the film of the container.

It is a further object of the present invention to provide a flexible reclosable container which may be constructed of an extremely thin film while providing a closure profile having sufficient thickness so as to effectively close said containers.

Other objects, advantages, features and equivalent structures within the scope of the invention will become apparent to those skilled in the art in connection with the teaching of the principles thereof in the specification claims and drawings.

BRIEF SUMMARY OF THE INVENTION

The present invention concerns a reclosable flexible container constructed as a pouch having a front wall with an inside and outside surface, a rear wall with an inside and an outside surface and a pouch opening. The front and rear walls of the pouch are preferably sealed to each other along their side edges and may be sealed together along their bottom edge or formed as a single sheet folded in half. A pair of exterior closure elements are positioned respectively on the outside surfaces of the front and rear wall of the pouch and in parallel to the pouch opening. A pair of interior closure elements are positioned respectively on the inside surfaces of the front and rear wall. Each interior closure element has a mechanism for mechanically interlocking with one of the exterior closure elements, with the wall of the pouch being interposed therebetween and engaged therein. As a result the interior closure elements are each affixed respectively to the inside surfaces of the front and rear walls of the pouch. The interior closure elements further have a mechanism for mechanically interlocking with each other within the pouch so as to selectively seal the pouch.

In one embodiment the interior closure elements each have a male profile and a female profile extending oppositely therefrom. The male profile on one of the interior closure elements is adapted for interlocking with the female profile on the other interior closure element. Similarly, in one embodiment, each of the interior closure elements has a male profile extending towards the inside surface of the pouch walls. On the exterior of each of the pouch walls is an exterior closure element which, in one embodiment, is a C-shaped track adapted to forcibly interlock over a male profile. When a male profile is pressed against the pouch wall, the pouch wall deforms so as to closely configure itself to the male profile. The C-shaped track is also deformable so as to interlock with the male profile, with the pouch wall being interposed therebetween. The respective male and female profiles of the interior closure elements are constructed so that they may be selectively interlocked or opened as desired by the user. As a result, a reclosable flexible container is provided in which the fastener profiles may be attached to the pouch without heat sealing. Consequently, pouches may be manufactured more quickly and at a lower cost. In addition, due to the absence of heat sealing, a thinner pouch wall may be utilized. Different materials may also be used for the interior and exterior closure elements and for the pouch walls.

BRIEF DESCRIPTION OF THE DRAWINGS

FIG. 1 is a front perspective view of the reclosable flexible container of the present invention.

FIG. 2 is a vertical section, partially broken away, taken along line 2—2 of the reclosable flexible container of FIG. 1.

FIG. 3 is a vertical section, partially broken away, of an alternate embodiment of the reclosable flexible container of FIG. 1.

FIG. 4 is a vertical section, partially broken away, of an additional alternate embodiment of the reclosable flexible container of FIG. 1.

FIG. 5 is a vertical section, partially broken away of an alternate embodiment of a fastener profile adapted for use in the flexible reclosable container of FIG. 4.

FIG. 6 is a vertical section of an additional alternative embodiment of a fastener profile for use with the flexible reclosable container of FIG. 4.

FIG. 7 is a vertical section, partially broken away of an additional alternative embodiment of a fastener profile suitable for use with the flexible reclosable containers of FIG. 4.

FIG. 8 is a front perspective view, partially broken away, of equipment for manufacturing the flexible reclosable containers of FIGS. 1-4.

FIG. 9 of the drawings is a front perspective view, partially broken away of equipment for manufacturing the flexible reclosable container of FIGS. 1-4.

DETAILED DESCRIPTION OF THE PREFERRED EMBODIMENT

While this invention is susceptible of embodiment in many different forms, there is shown in the drawings and will herein be described in detail several specific embodiments with the understanding that the invention is not limited thereto except insofar as those who have the disclosure before them are able to make modifications and variations therein without departing from the scope of the invention.

As best shown in FIG. 1, a reclosable flexible container 10 is provided in the form of a pouch 12. The pouch 12 has a front wall 14 and a rear or back wall 16, a right side edge 18, a left side edge 20, a bottom edge 22 and an upper or top edge 24. The pouch 12 has a pouch opening 26 along top edge 24. The front wall 14 and the rear or back wall 16 are sealed together along the right side edge 18 and their left side edge 20. The front wall 14 and rear wall 16 can also be sealed together along the bottom edge 22 or can be folded, as shown in FIG. 1.

As shown in FIG. 2, the front wall 14 has an outside surface 28 and an inside surface 30. Similarly, the rear wall 16 has an outside surface 32 and an inside surface 34. Mechanically affixed to the outside surface 28 of the front wall 14 is a first exterior closure element 36. Mechanically affixed to the outside surface 32 of the rear wall 16 is a second exterior closure element 38. A first interior closure element 40 is disposed on the inside surface 30 of the front wall 14. Similarly a second interior closure element 42 is disposed on the inside surface 34 of the rear wall 16. A mechanism 44 is provided for mechanically interlocking the exterior closure element 36 to the interior closure element 40, with the front wall 14 of the pouch 12 being interposed therebetween and engaged therein. Similarly, a mechanism 46 for mechanically interlocking the exterior closure 38 with the interior closure element 42, with the rear wall 16 of the pouch 12 being interposed therebetween and engaged therein is provided. As a result the interior closure elements 40 and 42 respectively are engaged with the inside surfaces 30 and 34 of the pouch 12. The combination of the interior closure elements 40 and 42 and the exterior closure elements 36 and 38 may collectively be described as a fastener assembly 48. A mechanism 50 is further provided for mechanically interlocking the first interior closure element 40 with the second interior closure element 42 so as to selectively seal said pouch.

In one embodiment, the mechanism 50 for interlocking the interior closure elements 40 and 42 includes a male profile 52 extending from the interior closure element 40. A female profile 54 exends from the interior closure element 42. The female profile 54 is positioned and sized for reception of and interlocking with the male profile 52, so as to seal the pouch 12. In addition, the interior closure elements 40 and 42 are constructed of a flexible plastic material which is elastic. Thus, the user may grasp the flange 56 which is the top part of the front wall 14 and the flange 58 which is the top part of the rear wall 16 and separate them, thereby causing the female profile 54 to deform and the male profile 52 to escape therefrom through opening 60. As a result pouch opening 26 may be opened. Conversely, when the user desires to seal pouch 12, the front wall 14 is pressed towards the rear wall 16 in the area proximate the interior closure elements 40 and 42, causing the male profile 52 to press against the opening 60 of the female profile 54. The opening 60 then is thereby caused to widen, allowing the male profile 52 to enter into and interlock with female profile 54.

As further shown in FIG. 2, the exterior closure elements 36 and 38 each comprise substantially C-shaped tracks 62 and 64 abutting against the respective exterior surfaces 28 and 32 of the front wall 14 and the rear wall 16. The mechanism 44 for mechanically interlocking the exterior closure element 36 with the first interior closure element 40 comprises a rib 66 oppositely disposed from the male profile 52 and abutting against the interior surface 30 of the front wall 14. The rib 66 is pressed against the interior surface 30 of the front wall 14 so as to distend the front wall 14. The exterior closure element 36, in the form of a C-shaped track 62 is snapped onto the rib 66 with the front wall 14 being interposed and engaged between the C-shaped track 62 and the rib 66. Due to the elasticity of the C-shaped track 62, the rib 66 is mechanically interlocked with the C-shaped track 62. Similarly, a rib 68 extends from the second interior closure element 42 and is oppositely disposed from the female profile 54. The rib 68 is pressed against the inside surface 34 of the rear wall 16 so as to distend the rear wall 16. The C-shaped track 64 is sufficiently elastic so as to snap over the rib 68 and to interlock therewith, with the rear wall 16 of the pouch 12 being interposed and engaged between the C-shaped track 68 and the rib 64. As a result, a pair of fastener profiles 52 and 54 are provided in pouch 12 without heat sealing of the fastener profiles to the pouch walls. Obviously the male and female profiles may be reversed so that the male profile 52 can extend from the second interior closure element 42 and the female profile 54 can extend from the first interior closure element 40, if desired. It should be further noted in FIGS. 2 and 3 that the ribs 66 and 68, in a preferred embodiment, comprise a substantially arrowhead shape adapted for interlocking with the C-shaped tracks 62 and 64, respectively.

As further shown in FIG. 2, the interior closure elements 40 and 42 may include wall support surfaces 70 and 72 which align the respective interior closure elements substantially normally to the interior surfaces 30 and 34 of the pouch 12 and maintain the separation of the interior surfaces 30 and 34 proximate the pouch opening 26. In the embodiment shown in FIG. 2, the wall support surface 70 comprises the outside surface of the base 74 of the first interior closure element 40. The male profile 52 extends substantially normally from the base 74. The rib 66 also extends substantially normally from the base 74, but is oppositely disposed from the male profile 52. The wall support surface 72 comprises the outside surface of the base 76 of the second interior closure element 42. The female profile 54 extends substantially normally from the base 76. The rib 68 is oppositely directed from the female profile 54, but also extends substantially normally from the base 76.

As shown in FIG. 3 of the drawings, in an alternate embodiment of the invention, the interior closure elements 40 and 42 are substantially the same as those described in FIG. 2, with the following exception. The base 74 of the first interior closure element 40 is curved at the juncture 78 so as to more closely correspond to the shape of the female profile 54. A portion 80 of the base 74 then extends radially away from the juncture 78 toward the pouch opening 26. Similarly, the base 76 of the second interior closure element 42 is curved at the juncture 82, with a portion 84 of the base 76 then extending substantially radially away towards the pouch opening 26. The base portions 80 and 84 are substantially similar and are aligned in parallel. As a result, when the container 10 is sealed, the portions 80 and 84 of the respective bases 74 and 76 are closely abutting each other proximate the pouch opening 26, so as to reduce the size of the pouch opening 26.

Turning now to FIG. 4 of the drawings, in an alternate embodiment of the invention, the first interior closure element 36 comprises a rod 86 extending substantially parallel to the pouch opening 26 and tightly pressed against the outside surface 28 of the front wall 14 so as to distend the front wall 14 and interlock with the first interior closure element 40. In the embodiment shown, the first interior closure element 40 includes a female profile 88 constructed and arranged for mechanical interlocking with the rod 86, with the front wall 14 being interposed therebetween and engaged therein. Similarly, in the embodiment shown, the second exterior closure element 38 comprises a rod 90 running substantially parallel to the pouch opening 26 and tightly pressed against the exterior surface 32 of the rear wall 16 so as to distend the rear wall 16 and interlock with the second interior closure element 42. In the embodiment shown, the second interior closure element 42 comprises a female profile 92 constructed, and arranged, i.e., of the proper size and material for interlocking with the rod 90, with the rear wall 16 being interposed therebetween and engaged therewith. Again, in the embodiment shown in FIG. 4, a male profile 52 extends from the first interior closure element 40 and is adapted for selective interlocking with a female profile 54 extending from the second interior closure element 42.

One of the features of the present invention is that the configuration of interior closure elements 40 and 42 is such that the force required to open container 12 from the outside by grasping flanges 56 and 58 and digitally separating them is considerably less than the force required to separate interior closure elements 40 and 42 from the inside of the container; i.e., from product pressing against the interior closure elements. This differential opening force is accomplished in a number of ways. In the embodiment shown in FIG. 2, the male profile 52, as mentioned above, comprises a T-shaped track 55. However, the downwardly depending portion of the T 55a is larger in size than the upwardly depending portion. Similarly, the lower arm 54a of the female profile 54 extends to approximately the middle of the female profile 54 whereas the upper arm 54b of the female profile only extends in an arc of approximately 120° leaving an opening 60. As a result, the lower portion of male profile 52 tends to engage the lower arm 54a of female profile 54 when product within container 12 is pressed against the respective profiles. However, when flanges 56 and 58 are separated, the male profile 52 is pivoted so that the upper arm 55b of the T-shaped member passes easily through opening 60 thereby allowing opening of container 12.

In the embodiment shown in FIG. 3, the upper portions 100 and 102 of the interior closure elements 40 and 42 are constructed so as to be juxtaposed when container 12 is in a closed configuration. Thus upper portions 100 and 102 tend to act as a pivot point when product within container 12 presses against interior closure elements 40 and 42. As a result, the lower portion 55a of the T-shaped track 55 of male profile 52 tends to remain interlocked with the lower portion of the female profile 54. Conversely, when flanges 56 and 58 are grasped and separated, the interior closure elements 40 and 42 act as a pivot point so that the female profile 54 tends to pivot around the T-shaped portion of the male profile 52 until the upper portion 55b of the T-shaped track 55 reaches opening 60 whereupon the interior closure elements 40 and 42 may be separated.

In the embodiment shown in FIG. 4, the interior closure elements 40 and 42 are curved proximate portions 100 and 102 respectively. As a result, when product within container 12 presses against interior closure elements 40 and 42, or more specifically against female profile 54, the intersection between portions 100 and 102 tends to act as a pivot point so as to retain the interior closure elements in an interlocked configuration conversely when flanges 56 and 58 are separated, female profile 54 pivots relative to male profile 52 until the upper portion 55b of the T-shaped track 55 reaches opening 60 whereupon the interior closure elements 40 and 42 may be easily separated.

Returning again to FIGS. 2 and 3, it should be noted that the exterior closure elements 36 and 38 extend normally from the pouch walls 14 and 16. In the embodiment shown in FIGS. 2 and 3, the C-shaped tubular track 62 includes a top curved portion 94 and a bottom curved portion 96. The top curved portion 94 and bottom curved portion 96 may also be called arms of the C-shaped track 62. Since C-shaped track 62 is flexible and resilient, the top curved portion 94 and bottom curved portion 96 may be separated and interlocked on rib 66 of the interior closure elements 40. The other C-shaped track 38 may be similarly constructed.

As further shown in FIGS. 2, 3 and 4 of the drawings, and mentioned above, the male profile 52 may comprise a substantially T-shaped track 55 extending from the first interior closure element 40. Alternatively, the male profile may comprise a L-shaped track 53 as seen in FIG. 9. The female profile 54 in a preferred embodiment, preferably comprises a substantially C-shaped track extending from the second interior closure element 42.

Turning now to FIG. 5 of the drawings, in one embodiment, the rod 86 may include a planar surface 98, which may be positioned facing outward so as not to protrude from the sidewall of the container and to interlock more tightly with the female profile 88. The rod 90 may be similarly constructed. As shown in FIG. 6, the rods 86 and 90 may also be constructed of a tubular material rather than of a solid cylinder.

As shown in FIG. 7 of the drawings, in an alternate embodiment, the rod 86 include an external flap 87 which acts as a friction bar for running the user's fingers along when closing the container. External flap 87 also serves to protect the underlying film from tearing. Conversely, either the first or second interior closure elements 40 or 42 may have a male profile in the shape of a rod 86 which is adapted for interlocking with the C-shaped track 62 as required.

Returning to FIG. 3 of the drawings, in one embodiment, the first and second interior closure elements 40 and 42 may include, respectively, spacer portions 100 and 102, which are substantially flat surfaces adapted for abutment against each other. Thus, when the exterior closure elements 36 and 38 are pressed towards each other, the interior closure elements 40 and 42 are similarly pressed together until the spacer portions 100 and 102 abut. In this position the male profile 52 is interlocked with the female profile 54. The spacer portions 100 and 102 also serve to maintain the interior closure elements 40 and 42 in a preferred position when sealed.

As shown in FIG. 4 of the drawings, the spacer portions 100 and 102 may alternatively comprise the exterior surfaces of the female profiles 88 and 92. When the interior closure elements 40 and 42 are abutted together at the spacer portions 100 and 102, the male profile 52 is interlocked with the female profile 54 and tends to remain in that position.

Although the closure system of the present invention is designed primarily for flexible reclosable containers, the use of mating interior/exterior closures may be used on single sheets of film for such products as roof coverings, tarps and swimming pool covers, and generally for hanging or attachment of objects together. For example, in an alternative embodiment, either interior closure element 40 or 42 may be used individually for interlocking with a single sheet of flexible film such as rear wall 16 and an exterior closure element such as exterior closure element 38. Interior closure element profile 42 is interlocked with a single sheet of flexible material such as rear wall 16, and exterior closure element 38 as disclosed above. However, rather than the first fastener profile 40, a third closure element, not shown, may be provided having at least one interlocking profile member such as male profile 52 extending therefrom, which is constructed and arranged for selective interlocking with the female profile member 54 extending from first fastener profile 40. The third interior closure element may be mechanically attached to a sheet of flexible film or another object or device as required. A system for attaching flexible film to objects without the use of heat seals or adhesives is thereby provided.

In a preferred embodiment, the first interior closure element 40 and second interior closure element 42 are constructed of a resilient elastic thermoplastic material such as polyethylene. Obviously other elastic thermoplastic materials may be utilized. The exterior closure elements 36 and 38 may be constructed of a similar thermoplastic material or of a different thermoplastic material such as polypropylene, nylon or other more rigid materials. It is particularly noteworthy however, that the interior and exterior closure elements need not be constructed of the same material as pouch 12 which may be constructed not only of polyethylene or polypropylene but of polyvinylidene chloride, foil laminations or other thermoplastic materials which are known to be difficult to seal reclosable profiles to. In addition, because of the absence of heat sealing, the pouch 12 may be constructed of films as thin as 1 mil or less.

Turning to FIG. 8 of the drawings, in one embodiment, a method of manufacturing the reclosable flexible container 10 is disclosed using a sheet 200 of thermoplastic film. While the embodiment shown is used for separating individual flexible reclosable containers from sheet 200 after manufacture, i.e., in a one up configuration, obviously two up manufacture and additional multiples may be manufactured, (as shown in FIG. 9). Interior closure elements are provided in the form of continuous strips 202 and 204. Similarly, exterior closure elements are provided in the form of continuous strips 206 and 208. When cut to the desired length, the continuous strips 202 and 204 provide interior closure elements 40 and 42. Similarly, when cut to the desired length, the continuous strips 206 and 208 provide exterior closure elements 36 and 38 in the form of C-shaped tracks.

The continuous strips 202, 204, 206 and 208 are pressed tightly against the flexible film 200 by rollers 210 and 212, causing the ribs 66 and 68 to distend the flexible film 200 and to pry apart the C-shaped tracks 62 and 64 and interlock them with the interior closure elements 40 and 42 respectively. The flexible film 200 is interposed between the interior and exterior closure elements as shown at numerals 214 and 216. The flexible film 200 may then be folded along center line 218 so as to form a half folded sheet 220. The half folded sheet 220 may then be heat sealed transversely across web 200 so as to form individual bags. If desired, the interior closure elements 40 and 42 may be mechanically interlocked by pressing them together through the use of rollers 210 and 212.

Once sealed, the individual pouches 12 may be cross cut from the half folded sheet 220. In an alternate embodiment of the invention, not shown in the drawings, the C-shaped tracks 62 and 64 may be spread apart through the use of a guide (not shown) prior to being pressed against rib 66 and 68 respectively for interlocking. Again, a sheet of flexible film 200 is interposed between the interior closure elements 40 and 42 and the exterior closure elements 36 and 38. As a result, a high speed method of manufacturing flexible reclosable containers is provided without the use of heat seals, which increases the efficiency of the process, reduces defects and allows the use of new combinations of materials.

Turning to FIG. 9 of the drawings, in an alternate preferred embodiment of the invention, reclosable flexible containers 10 may be manufactured using a U-sheet 300 of thermoplastic film. U-sheet 300 is formed from a single sheet of plastic film having longitudinal folds 300a and 300b which form its lateral edges. Interior closure elements 40 and 42 are provided in the form of continuous strips 302 and 304 which are interlocked prior to insertion into U-sheet 300. Similarly, a second set of interior closure elements 40 and 42 are provided in the form of continuous interior strips 306 and 308. Two sets of interior closure elements are required because of the two up manufacturing process; i.e., bags such as bags 12 and 12a are separated two at a time from U-sheet 300 at the end of the manufacturing process. Although continuous interior strips 302, 304, 306 and 308 may be supplied in roll form and fed into U-sheet 300, in a preferred embodiment the continuous interior strips are extruded from thermoplastic material such as (polyethylene, polypropylene etc.), cooled, interlocked into pairs, and fed directly into U-sheet 300.

Continuous interior strip 302, as may be seen when enlarged, has a male profile 52 extending therefrom and a rib 66 oppositely extending therefrom. Continuous interior strip 304 has a female profile 54 extending therefrom and a rib 68 oppositely extending therefrom.

Exterior closure elements 36 and 38 are provided in the form of continuous exterior strips 310, 312, 314 and 316 which are provided on the exterior upper and lower surfaces 318 and 320 respectively of U-sheet 300. Continuous exterior strips 310 and 312 are aligned in parallel with continuous interior strips 302 and 304, with continuous exterior strip 310 positioned below lower surface 320 of U-sheet 300 and continuous exterior strip 312 being positioned above upper surface 318 of U-sheet 300. Continuous exterior strip 314 and 316 are similarly situated above and below U-sheet 300 with continuous interior strips 306 and 308 being contained within U-sheet.

The continuous exterior strips 310, 312, 314 and 316 are pressed tightly against the flexible film of U-sheet 300 between rollers 210 and 212, causing the ribs 66 and 68 of continuous interior strips 302, 304 and 306 and 308 to distend the flexible film of U-sheet 300. The exterior strips 310, 312, 314 and 316 are formed as C-shaped tracks such as tracks 66 and 64. The compression of these tracks against rib 66 and 68 causes the tracks to open and then interlock with ribs 66 and 68, with the flexible film 300 being interposed therebetween.

A longitudinal score or series of perforations 322 is formed along the center line of U-sheet 300 by a knife or perforating wheel (not shown). After interlocking of the interior and exterior closure elements, U-sheet 300 may be cut transversely and simultaneously sealed to form side seals 18 and 20 of containers 12 and 12a. Containers 12 and 12a may then be separated along longitudinal score line 322 so as to provide individual flexible reclosable containers.

The foregoing description and drawings merely explain and illustrate the invention and the invention is not limited thereto except insofar as those who have the disclosure before them are able to make modifications and variations therein without departing from the scope of the invention.

What is claimed is:

1. A flexible reclosable container comprising:
    a pouch having a front wall with an inside and outside surface, a rear wall with an inside and outside surface and a pouch opening, said pouch being constructed of a flexible, thin thermoplastic film;
    a pair of continuous exterior closure elements positioned on the respective outside surface of said front and rear walls;
    a pair of continuous interior closure elements, each interior closure element having means mechanically interlocking with one of said exterior closure elements with one of said walls of said pouch being continuously interposed between said closure elements so as to affix said interior closure elements to said inside surface of one of said walls of said pouch, by said means, said interior closure elements further having means for mechanically interlocking with each other so as to selectively seal said pouch.

2. The flexible reclosable container of claim 1 wherein each of said means for interlocking said interior closure elements with each other comprises a male profile extending from a first one of said pair of interior closure elements and a female profile extending from a second one of said pair of interior closure elements, said male and female profiles being constructed and arranged for interlocking so as to selectively seal said pouch opening.

3. The flexible reclosable container of claim 2 wherein said male profile comprises a substantially T-shaped track.

4. The flexible reclosable container of claim 2 wherein said female profile comprises a substantially C-shaped track.

5. The flexible reclosable container of claim 2 wherein said male profile comprises a substantially L-shaped track.

6. The flexible reclosable container of claim 2 wherein said interior closure elements include means for providing a differential opening force so that said container resists opening from movement of product within said container, but is easily opened by manual separation of said interior closure elements.

7. The flexible reclosable container of claim 6 wherein said means for providing a differential opening force comprises:
    an upper arm extending from said female profile, a lower arm extending from said female profile and an opening therebetween constructed and arranged for passage of said male profile, said opening being positioned towards the top of said container so as to facilitate release of said male profile from said female profile when said walls of said container are separated at said top of said container, and to retard removal of said male profile when force is exerted against said interior closure elements by product within said container.

8. The flexible reclosable container of claim 6 wherein said means for providing a differential opening force comprises a substantially T-shaped track extending from said male profile, said substantially T-shaped track having an upper portion and a lower portion, said lower portion being larger then said upper portion so as to cause said interior closure elements to be more easily separated from above than from below.

9. The flexible reclosable container of claim 6 wherein said means for providing differential opening of said container comprises biasing of said male profile away form said pouch opening.

10. The flexible reclosable container of claim 6 wherein said means for providing differential opening of said container comprises upper portions of said interior closure elements configured for juxtaposition when said interior closure elements are interlocked so that said interior closure elements tend to pivot against one another and said upper portions remain interlocked when force is exerted against said interior closure elements from product within said container.

11. The flexible reclosale container of claim 6 wherein said means for providing a differential opening force comprises a substantially L-shaped track extending from said male profile, said L-shaped track being downwardly depending so as to cause said interior closure element to be more easily separated from above than from below.

12. The flexible reclosable container of claim 1 wherein each of said exterior closure elements comprises a substantially C-shaped track disposed against said exterior surface of one of said walls and said means mechanically interlocking with one of said exterior closure elements comprises a rib extending from said interior closure element, said rib being constructed and arranged for distending said wall and interlocking through said wall with said C-shaped track, said wall of said pouch being interposed and engaged between said C-shaped track and said rib.

13. The flexible reclosable container of claim 12 wherien said interior closure elements each include a substantially C-shaped base, one leg of said C-shaped base comprising said rib extending therefrom so that when said rib is interlocked with said exterior closure element, said interior closure element is disposed substantially horizontally in said pouch.

14. The flexible reclosable container of claim 1 wherein each of said interior closure elements includes a wall support surface for aligning said interior closure element substantially normally to said walls of said pouch and for maintaining the separation of said interior surfaces of said front and rear walls of said pouch proximate said pouch opening after interlocking of said interior closure elements.

15. The flexible reclosable container of claim 1 wherein each of said exterior closure elements comprises a rod extending substantially parallel to said pouch opening and tightly pressed against said outside surface of one of said walls so as to distend said wall and interlock with one of said interior closure elements.

16. The flexible reclosable container of claim 6 wherein said rod includes a planar surface adapted for interlocking with said interior closure element.

17. The flexible reclosable container of claim 1 wherein said means mechanically interlocking with said exteror closure elements face said interior surfaces of said walls of said pouch and said means for mechanically interlocking said interior closure elements with each other face the opposite interior surface of said wall of said pouch.

18. The flexible reclosable container of claim 1 wherein said interior closure elements are manually releasable from each other after interlocking.

19. The flexile reclosable container of claim 1 wherein said pouch is constructed of a first thermoplastic material and said interior closure elements are constructed of a second thermoplastic material.

20. The flexible reclosable container of claim 1 wherein said interior closure elements are constructed of a first thermoplastic material and said exterior closure elements are constructed of a second thermoplastic material.

21. The flexible reclosable container of claim 1 wherein said interior and exterior closure elements are disposed substantially parallel to each other and to said pouch opening.

* * * * *